US008059029B2

(12) United States Patent
Juang

(10) Patent No.: US 8,059,029 B2
(45) Date of Patent: Nov. 15, 2011

(54) ACTIVE GPS TRACKING SYSTEM AND METHOD FOR REPORTING POSITION THEREOF

(75) Inventor: Jr-Fu Juang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 157 days.

(21) Appl. No.: 12/699,983

(22) Filed: Feb. 4, 2010

(65) Prior Publication Data

US 2010/0253503 A1 Oct. 7, 2010

(30) Foreign Application Priority Data

Apr. 1, 2009 (CN) .......................... 2009 1 0301277

(51) Int. Cl.
G01S 19/34 (2010.01)
G01S 19/26 (2010.01)
G01S 19/23 (2010.01)
(52) U.S. Cl. .......... 342/357.74; 342/357.65; 342/357.62
(58) Field of Classification Search ............. 342/357.74, 342/357.65, 357.62
See application file for complete search history.

(56) References Cited

U.S. PATENT DOCUMENTS 6,300,875 B1* 10/2001 Schafer ...................... 340/573.1
2003/0169335 A1* 9/2003 Monroe ........................ 348/143

* cited by examiner

Primary Examiner — Harry Liu
(74) Attorney, Agent, or Firm — Altis Law Group, Inc.

(57) ABSTRACT

An active GPS tracking system and method includes a user setting interface for receiving a reporting distance, a distance trigger module, a GPS module and a wireless communication module. The distance trigger module calculates a moving distance of the active GPS tracking system, and generates and sends an interrupt signals to the GPS module to make it enter a working mode when the moving distance is greater than or equal to the reporting distance. Then, the GPS module determines a current position of the active GPS tracking system and determines whether an actual displacement is greater than or equal to the reporting distance to determine if reporting the current position. If the actual displacement is greater than or equal to the reporting distance, the wireless communication module receives the current position from the GPS module, and reports to a monitor center.

10 Claims, 4 Drawing Sheets

ACTIVE GPS TRACKING SYSTEM AND METHOD FOR REPORTING POSITION THEREOF

BACKGROUND

1. Technical Field

The present disclosure relates to Global Positioning Systems (GPS), and especially to an active GPS tracking system and a method for reporting its position.

2. Description of Related Art

The Global Positioning System (GPS) is a communication system that transmits, receives, or processes signals via a plurality of satellites. An active GPS situated on a target can determine a current position of the target via communication with the plurality of satellites, and report the current position to a monitor center. Generally, an active GPS is required to report the current position of the target to the monitor center at predetermined time or distance intervals. That is, the active GPS is supposed to communicate with the satellites every the predetermined time or distance intervals to determine the position of the target. However, in general situations, the target might not move for a relative long time. The active GPS still reports the position of the target to the monitor center at the predetermined time intervals, which results in unneeded power consumption.

Therefore, a need exists in the industry to overcome the described limitations.

DETAILED DESCRIPTION

Figure 1:
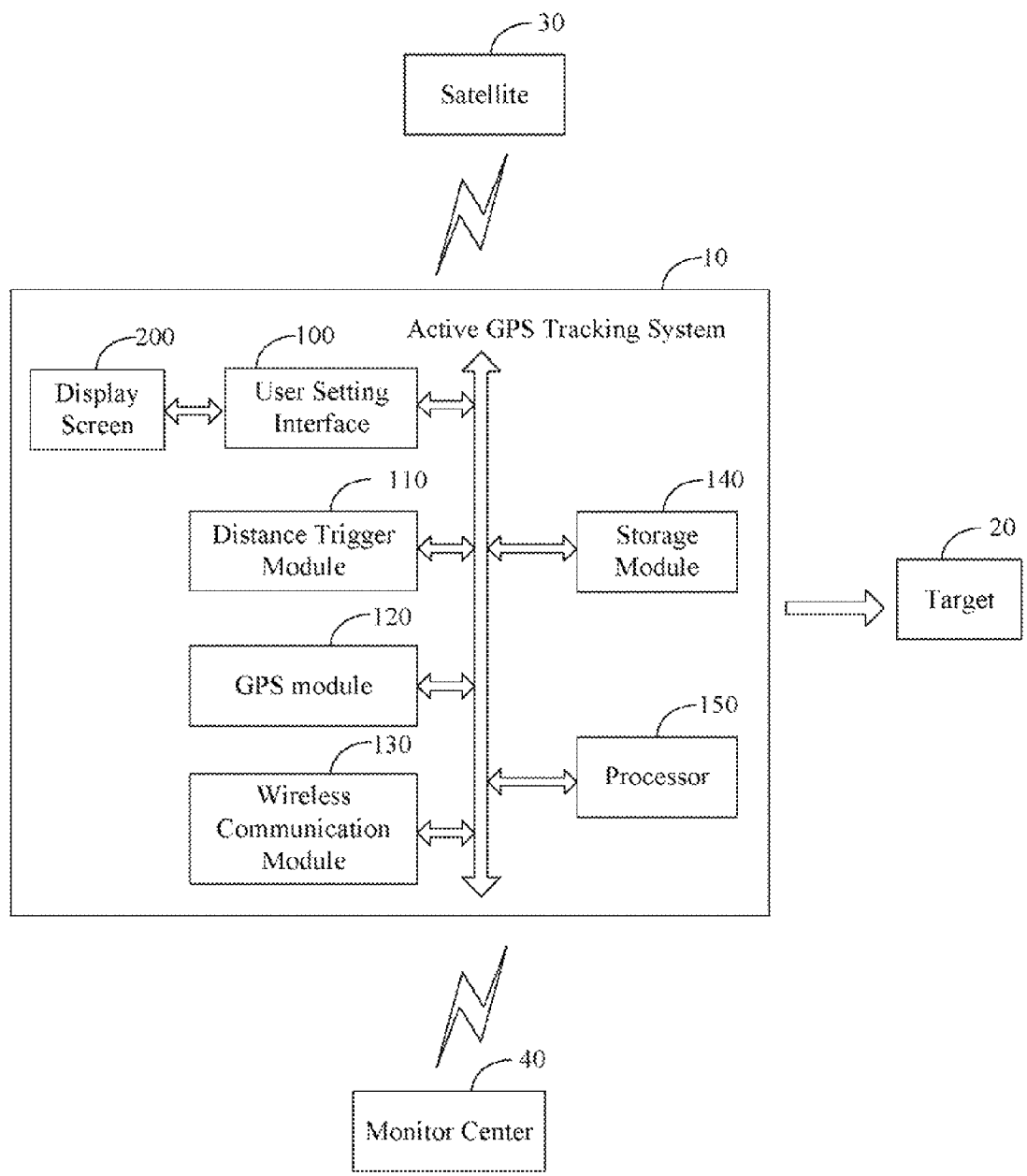
FIG. 1 is a block diagram of an active GPS tracking system according to one embodiment of the present disclosure.

FIG. 1 shows a block diagram of an active global positioning system (GPS) tracking system 10 according to one embodiment of the present disclosure. The active GPS tracking system 10, may be used to track a target 20, such as a car, an old person, or a child, and communicates with a plurality of satellites 30 (for simplicity, only one is shown) to determine positions of the target 20 and report the determined position to a monitor center 40 via an electronic communication network. In the embodiment, the active GPS tracking system 10 includes a user setting interface 100, a distance trigger module 110, a GPS module 120 and a wireless communication module 130. The modules 110, 120, 130 may comprise one or more computerized operations that are executed by a processor 150.

The user setting interface 100 is used to preset a setting interface of the active GPS tracking system 10 for a user. For example, the user interface 100 may be used to preset an input box on a display screen 200 to receive a reporting distance and/or a predetermined sensing time period. The reporting distance may be used to be compared with a moving distance of the active GPS tracking system 10, and the predetermined sensing time period may be used to provide a parameter for calculating the moving distance.

Figure 2:
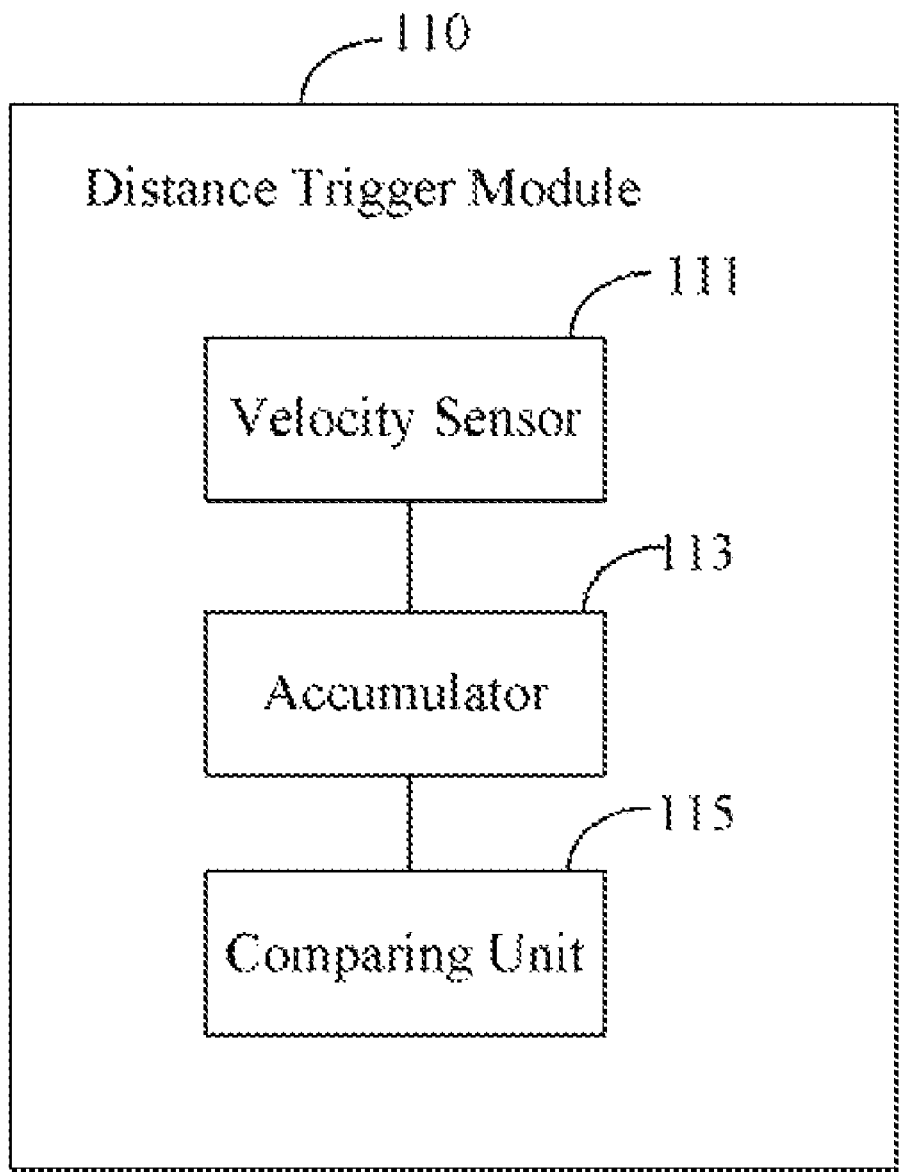
FIG. 2 is a block diagram of a distance trigger module of the active GPS tracking system of FIG. 1.

The distance trigger module 110 is used to calculate the moving distance of the active GPS tracking system 10, compare the moving distance with the reporting distance, and generate and send an interrupt signal when the moving distance is greater than or equal to the reporting distance input by the user. Referring to FIG. 2, in the embodiment, the distance trigger module 110 includes a velocity sensor 111, an accumulator 113, and a comparing unit 115. The velocity sensor 111, such as a G-sensor, is used to sense a moving velocity of the active GPS tracking system 10. The accumulator 113 is used to calculate the moving distance according to the moving velocity and the predetermined sensing time period. The comparing unit 115 is used to compare the moving distance with the reporting distance, and further generate and send the interrupt signal to the GPS module 120 when the moving distance is greater than or equal to the reporting distance.

The GPS module 120 is used to determine a current position of the active GPS tracking system 10 upon receiving the interrupt signal, and calculate an actual displacement of the active GPS tracking system based on the current position and a previous position determined upon receiving a previous interrupt signal, and determine whether the actual displacement is greater than or equal to the reporting distance to determine whether the current position needs to be reported.

The wireless communication module 130 is used to receive the current position from the GPS module 120 and report the current position to the monitor center 40 when the actual displacement is greater than or equal to the reporting distance. In the embodiment, the wireless communication module 130 communicates with the monitor center 40 complying with specific communication protocols, such as Government Standards Manual (GSM), General Packet Radio Service (GPRS), Wideband Code Division Multiple Access (WCDMA) or Worldwide Interoperability for Microwave Access (WIMAX). In the embodiment, the GPS module 120 enters a sleep mode as soon as it sends out the current position to the wireless communication module 130, and wakes up when receiving the interrupt signal, thereby reducing power consumption.

When the active GPS tracking system 10 is powered on, the GPS module 120 determines and stores an initial position of the active GPS tracking system 10, then enters the sleep mode. When the GPS module 120 receives the interrupt signal, the GPS module 120 wakes up from the sleep mode and enters a working mode. In the working mode, the GPS module 120 determines the current position of the active GPS tracking system 10 and calculates the actual displacement via comparing the current position with the initial position, and compares the actual displacement with the reporting distance.

If the actual displacement is greater than or equal to the reporting distance, the GPS module 120 sends the current position of the active GPS tracking system 10 to the wireless communication module 130, and stores the current position, as a comparing value, instead of the initial position. That is, if the initial position of the GPS module 120 is in the current position of the active GPS tracking system 10 determined by the GPS module 120 the last time. Simultaneously, the GPS module 120 resets the moving distance calculated by the accumulator 113 as zero. Then the GPS module 20 enters the sleep mode. In the embodiment, the GPS module 120 sends a pulsing signal to the accumulator 113 to reset the moving distance as zero. When the moving distance calculated by the accumulator 113 is reset as zero, the velocity sensor 111 senses the moving velocity of the active GPS tracking system 10 over again, and the accumulator 113 recalculates the moving distance according to the moving velocity and the predetermined sensing time period. Then, the comparing unit 115 compares the moving distance with the reporting distance as described above.

When the actual displacement is less than the reporting distance, it is indicated that the active GPS tracking system 10 is moving in a small scope. Then the GPS module 120 resets the moving distance as the actual displacement and enters the sleep mode without reporting the current position of the active GPS tracking system 10 to the wireless communication module 130. When the moving distance is reset as the actual displacement, the velocity sensor 111 of the distance trigger module 110 senses the moving velocity of the active GPS tracking system 10 over again, and the accumulator 113 of the distance trigger module 110 recalculates the moving distance according to the moving velocity and the predetermined sensing time period.

In the embodiment, the wireless communication module 130 may receive a request for reporting the current position from the monitor center 40 and send the request to the GPS module 120. The GPS module 120 enters the working mode after receiving the request and determines the current position of the active GPS tracking system 10, and then reports the current position to the monitor center 40 via the wireless communication module 130.

In the embodiment, the active GPS tracking system 10 further includes a storage module 140 to communicate with the user setting interface 100, the distance trigger module 110 and the GPS module 120, respectively, to store the reporting distance.

In the embodiment, the active GPS tracking system 10 calculates the approximate moving distance thereof. When the moving distance is greater than or equal to the reporting distance, the GPS module 120 enters the working mode according to the received interrupt signal. In this way, active time of the GPS module 120 is shortened, which lowers consumed power and extends the life of the active GPS tracking system 10.

Figure 3:
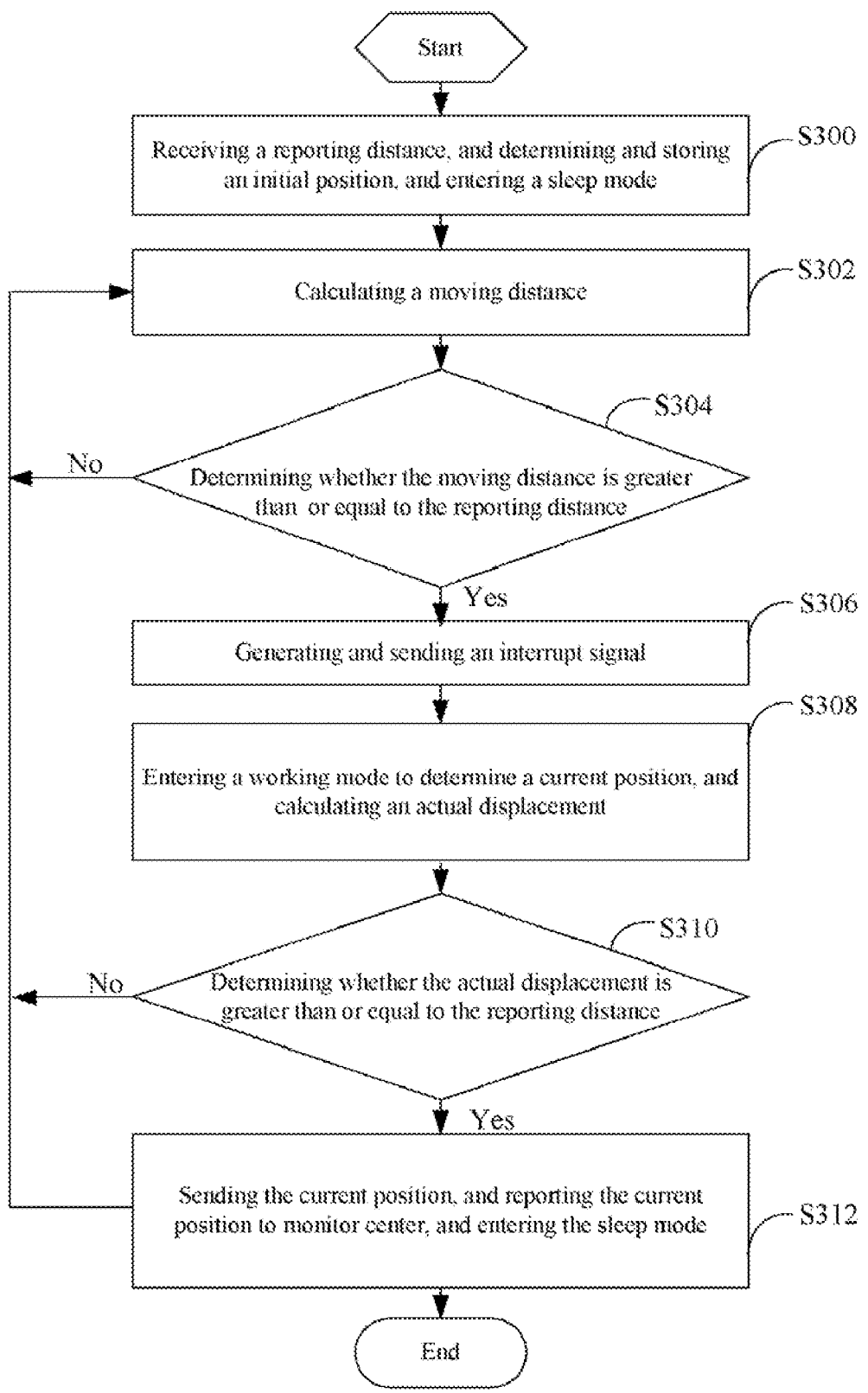
FIG. 3 is a flowchart of one embodiment of a method of the active GPS tracking system reporting a position of a target according to the present disclosure.

FIG. 3 is a flowchart of one embodiment of a method of an active GPS tracking system 10 reporting the position of the target 20 in accordance with the present disclosure. The method may be embodied in the active GPS tracking system 10, and is executed by the functional modules illustrated in FIG. 1. Depending on the embodiment, additional blocks may be added, others deleted, and the ordering of the blocks may be changed while remaining well within the scope of the disclosure.

In block S300, the user setting interface 100 receives the reporting distance input by the user, and the GPS module 120 determines and stores the initial position and enters the sleep mode. In block S302, the distance trigger module 110 calculates the moving distance of the active GPS tracking system 10. In block S304, the distance trigger module 110 determines whether the moving distance is greater than or equal to the reporting distance.

If the distance is less than the reporting distance, the flow returns back to the block S302. If the distance is greater than or equal to the reporting distance, in block S306, the distance trigger module 110 generates and sends the interrupt signal to the GPS module 120. In block S308, the GPS module 120 enters the working mode, determines the current position of the active GPS tracking system 10, and calculates the actual displacement of the active GPS tracking system 10 according to the current position and a previous position. If it is the first time to calculate the actual displacement, the previous position is the initial position. In block S310, the GPS module 120 determines whether the actual displacement is greater than or equal to the reporting distance.

If the actual displacement is greater than or equal to the reporting distance, in block S312, the GPS module 120 sends the current position of the active GPS tracking system 10 to the wireless communication module 130, to report the current position to the monitor center 40. Then the GPS module 120 enters the sleep mode and the flow returns back to the block S302.

If the actual displacement is less than the reporting distance, the flow returns back to the block S302. In the embodiment, the method of the active GPS tracking system 10 reporting the position of the target 20 is executed circularly in the flow described above until the active GPS tracking system 10 is powered off.

Figure 4:
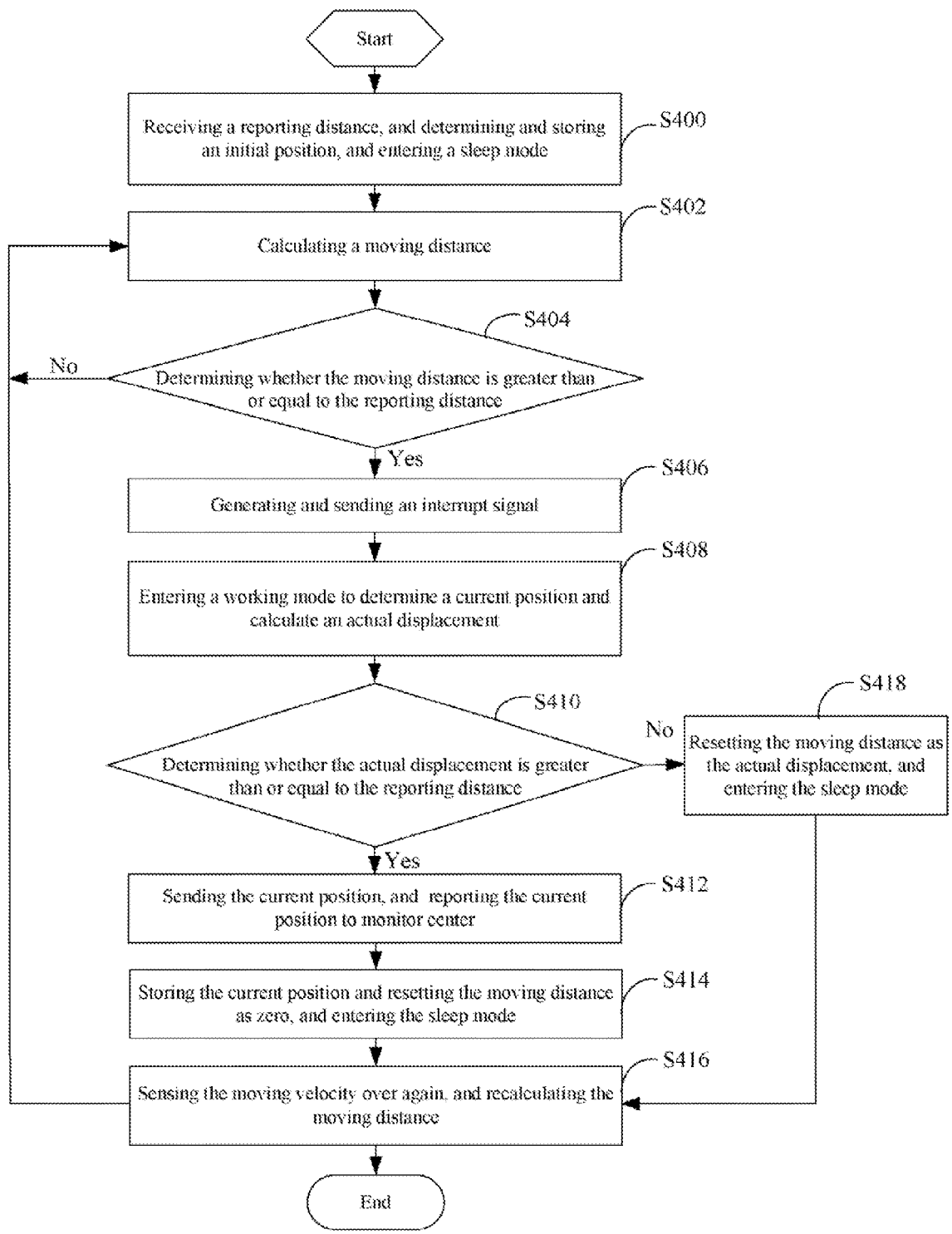
FIG. 4 is a flowchart of another embodiment of a method of the active GPS tracking system reporting a position of a target according to the present disclosure.

FIG. 4 is a flowchart of another embodiment of a method of an active GPS tracking system 10 reporting the position of the target 20 in accordance with the present disclosure. The method may be embodied in the active GPS tracking system 10, and is executed by the functional modules such as those of FIG. 1. Depending on the embodiment, additional blocks may be added, others deleted, and the ordering of the blocks may be changed while remaining well within the scope of the disclosure.

In block S400, the user setting interface 100 receives the reporting distance input by the user, and the GPS module 120 determines and stores an initial position thereof and enters the sleep mode. In block S402, the velocity sensor 111 senses the moving velocity of the active GPS tracking system 10, and the accumulator 113 calculates the moving distance according to the moving velocity and the predetermined sensing time period. In block S404, the comparing unit 115 determines whether the moving distance is greater than or equal to the reporting distance.

If the moving distance is less than the reporting distance, the flow returns back to the block S402. If the moving distance is greater than or equal to the reporting distance, in block S406, the comparing unit 115 generates and sends an interrupt signal to the GPS module 120. In block S408, the GPS module 120 enters the working mode, and determines the current position of the active GPS tracking system 10, and calculates the actual displacement of the active GPS tracking system 10 based on the current position and a previous position. If it is the first time to calculate the actual displacement, the previous position is the initial position. In block S410, the GPS module 120 determines whether the actual displacement is greater than or equal to the reporting distance.

If the actual displacement is greater than or equal to the reporting distance, in block S412, the GPS module 120 sends the current position of the active GPS tracking system 10 to the wireless communication module 130, to report the current position to the monitor center 40. In block S414, the GPS module 120 stores the current position as a previous position of next calculation of the actual displacement. At same time, the GPS module 120 resets the moving distance calculated by the accumulator 113 as zero, then the GPS module 20 enters the sleep mode. In the embodiment, the GPS module 120 sends a pulsing signal to the accumulator 113 to reset the moving distance as zero. In block S416, the velocity sensor 111 senses the moving velocity of the active GPS tracking system 10 over again, and the accumulator 113 recalculates the moving distance. Then the flow returns back to the block S402.

If the actual displacement is less than the reporting distance, in block S418, the GPS module 120 resets the moving distance as the actual displacement and enters the sleep mode. After that, the flow moves to the block S416 described above, where the velocity sensor 111 senses the moving velocity of the active GPS tracking system 10 over again, and the accumulator 113 recalculates the moving distance. Then the flow returns back to the block S402.

In the embodiment, the method of the active GPS tracking system 10 reporting the position of the target 20 is executed circularly in the flow described above until the active GPS tracking system 10 is powered off.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. An active GPS tracking system used to report a position of a target to a monitor center, comprising:
    a user setting interface, used to receive a reporting distance;
    a distance trigger module, used to calculate a moving distance of the active GPS tracking system and generate and send an interrupt signal when the moving distance is greater than or equal to the reporting distance;
    a GPS module that enters a working mode if receiving the interrupt signal, and used to determine a current position of the active GPS tracking system, and determine whether an actual displacement is greater than or equal to the reporting distance to determine if the current position is required to be reported; and
    a wireless communication module, used to receive the current position from the GPS module, wherein if the actual displacement is greater than or equal to the reporting distance, the wireless communication module reports the current position to the monitor center; and
    a processor to execute the user setting interface, the distance trigger module, the GPS module and the wireless communication module;
    wherein the GPS module enters a sleep mode if sending the current position.

2. The active GPS tracking system as claimed in claim 1, wherein the distance trigger module comprising:
    a velocity sensor, to sense a moving velocity of the active GPS tracking system;
    an accumulator, to calculate the moving distance according to the moving velocity and a predetermined sensing time period; and
    a comparing unit, to compare the moving distance with the reporting distance, and further generate and send the interrupt signal to the GPS module when the moving distance is greater than or equal to the reporting distance.

3. The active GPS tracking system as claimed in claim 2, wherein when an actual displacement of the active GPS tracking system is greater than or equal to the reporting distance, the GPS module stores the current position instead of an initial position thereof, and resets the moving distance as zero, then enters the sleep mode.

4. The active GPS tracking system as claimed in claim 3, wherein when the moving distance is reset as zero, the velocity sensor senses the moving velocity of the active GPS tracking system over again, and the accumulator recalculates the moving distance according to the moving velocity and the predetermined sensing time period.

5. The active GPS tracking system as claimed in claim 2, wherein when the actual displacement is less than the reporting distance, the GPS module resets the moving distance as the actual displacement and enters the sleep mode.

6. The active GPS tracking system as claimed in claim 5, wherein when the moving distance is reset as the actual displacement, the velocity sensor of the distance trigger module senses the moving velocity of the active GPS tracking system over again, and the accumulator of the distance trigger module recalculates the moving distance according to the moving velocity and the predetermined sensing time period.

7. A method of an active GPS tracking system reporting a position of a target to a monitor center comprising:
    receiving a reporting distance, and making a GPS module determine and store an initial position and enter a sleep mode;
    calculating a moving distance of the active GPS tracking system;
    determining whether the moving distance is greater than or equal to the reporting distance;
    if the moving distance is greater than or equal to the reporting distance, generating and sending an interrupt signal to the GPS module;
    making the GPS module enter a working mode to determine a current position of the active GPS tracking system, and calculate an actual displacement of the active GPS tracking system;
    determining whether the actual displacement is greater than or equal to the reporting distance; and
    if the actual displacement is greater than or equal to the reporting distance, sending the current position of the active GPS tracking system to the wireless communication module, to report the current position to the monitor center, and entering the sleep mode.

8. The method as claimed in claim 7, wherein calculating the moving distance of the active GPS tracking system comprising:
    sensing a moving velocity of the active GPS tracking system; and
    calculating the moving distance according to the moving velocity and a predetermined sensing time period.

9. The method as claimed in claim 8, further comprising:
    if the actual displacement is greater than or equal to the reporting distance, storing the current position of the active GPS tracking system;
    resetting the moving distance as zero and entering the sleep mode; and
    sensing the moving velocity of the active GPS tracking system over again, so as to recalculates the moving distance according to the moving velocity and the predetermined sensing time period.

10. The method as claimed in claim 8, further comprising:
    resetting the moving distance as the actual displacement and entering the sleep mode; and
    sensing the moving velocity of the active GPS tracking system over again, so as to recalculates the moving distance according to the moving velocity and the predetermined sensing time period.

* * * * *